(12) United States Patent
Totsuka et al.

(10) Patent No.: US 11,060,692 B2
(45) Date of Patent: Jul. 13, 2021

(54) VEHICLE LAMP

(71) Applicant: Koito Manufacturing Co., Ltd., Tokyo (JP)

(72) Inventors: Takahiro Totsuka, Shizuoka (JP); Daisuke Takahashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/572,717

(22) Filed: Sep. 17, 2019

(65) Prior Publication Data

US 2020/0088381 A1  Mar. 19, 2020

(30) Foreign Application Priority Data

Sep. 19, 2018 (JP) ............................. JP2018-175160

(51) Int. Cl.
| | |
|---|---|
| *F21S 45/435* | (2018.01) |
| *F21S 45/47* | (2018.01) |
| *F21W 102/00* | (2018.01) |
| *F21S 41/255* | (2018.01) |
| *F21Y 115/10* | (2016.01) |

(Continued)

(52) U.S. Cl.
CPC ............ *F21S 45/435* (2018.01); *F21S 45/47* (2018.01); *F21S 41/148* (2018.01); *F21S 41/255* (2018.01); *F21S 41/321* (2018.01); *F21W 2102/00* (2018.01); *F21W 2103/20* (2018.01); *F21Y 2115/10* (2016.08)

(58) Field of Classification Search
CPC ........... F21S 45/42; F21S 45/435; F21S 45/47
See application file for complete search history.

(56) References Cited

U.S. PATENT DOCUMENTS

| 2007/0091632 A1* | 4/2007 | Glovatsky | ............. F21S 41/148 |
| | | | 362/547 |
| 2009/0080211 A1* | 3/2009 | Yasuda | ................. F21S 41/148 |
| | | | 362/547 |

(Continued)

FOREIGN PATENT DOCUMENTS

| JP | 2006294263 | * 10/2006 | ............. F21S 45/435 |
| JP | 2010262903 | * 11/2010 | ............. F21S 45/49 |
| JP | 2014-146465 A | 8/2014 | |

OTHER PUBLICATIONS

English Machine Translation of JP2010262903 Provided by ESPACENET (Year: 2010).*

*Primary Examiner* — Zheng Song

(74) *Attorney, Agent, or Firm* — Abelman, Frayne & Schwab

(57) ABSTRACT

A vehicle lamp includes: a lamp body having a front opening; a front cover attached to the lamp body to cover the front opening and configured to form a lamp chamber with the lamp body; a lamp unit including at least one light emitting element mounting portion having a heat dissipation portion, and disposed in the lamp chamber; an air blower configured to generate, in the lamp chamber, an air circulation flow including a cooling flow sent in a forward direction toward the heat dissipation portion and an intake flow returning to the rear, and an air blower support member configured to support the air blower so as to dispose the air blower behind the lamp unit in the lamp chamber, and to form an intake space through which the intake flow passes below the cooling flow.

6 Claims, 4 Drawing Sheets

(51) Int. Cl.
   *F21S 41/148*      (2018.01)
   *F21S 41/32*       (2018.01)
   *F21W 103/20*      (2018.01)

(56) References Cited

U.S. PATENT DOCUMENTS

| | | | | |
|---|---|---|---|---|
| 2009/0154189 | A1* | 6/2009  | Cho ......................... | F21V 29/71 |
| | | | | 362/547 |
| 2009/0262550 | A1* | 10/2009 | Inoue .................... | F21S 41/148 |
| | | | | 362/547 |
| 2009/0303742 | A1* | 12/2009 | Yasuda .................. | F21S 45/43 |
| | | | | 362/547 |
| 2010/0020563 | A1* | 1/2010  | Ito .......................... | F21V 29/67 |
| | | | | 362/547 |
| 2010/0103689 | A1* | 4/2010  | Lee ........................ | F21S 41/147 |
| | | | | 362/487 |
| 2010/0315830 | A1* | 12/2010 | Wan ....................... | F21S 41/147 |
| | | | | 362/547 |
| 2011/0051453 | A1* | 3/2011  | Nagasawa ............... | F21S 45/43 |
| | | | | 362/547 |
| 2012/0092885 | A1* | 4/2012  | Hong .................... | F21S 41/148 |
| | | | | 362/547 |
| 2017/0088034 | A1* | 3/2017  | Nakazato ................ | F21S 45/70 |
| 2017/0160542 | A1* | 6/2017  | Mouri ................... | F21S 41/147 |
| 2017/0328535 | A1* | 11/2017 | Yagi ....................... | F21S 41/663 |
| 2018/0080620 | A1* | 3/2018  | Kim ....................... | F21S 45/435 |
| 2018/0142861 | A1* | 5/2018  | Tessnow ................. | F21S 45/49 |
| 2019/0383458 | A1* | 12/2019 | Matsumoto ............. | F21S 45/43 |

\* cited by examiner

VEHICLE LAMP

CROSS-REFERENCE TO RELATED APPLICATIONS

This application is based on and claims priority from Japanese Patent Application No. 2018-175160, filed on Sep. 19, 2018, with the Japan Patent Office, the disclosure of which is incorporated herein in its entirety by reference.

TECHNICAL FIELD

The present disclosure relates to a vehicle lamp. Particularly, the present disclosure relates to a vehicle lamp used in a vehicle such as a car.

BACKGROUND

A vehicle lamp includes components, such as, for example, a light source that may generate heat during use. In order to facilitate a heat dissipation from such components, a heat dissipation portion referred to as a "heat sink" is provided. Additionally, a fan is provided to cool the heat dissipation portion. For example, in Japanese Patent Laid-Open Publication No. 2014-146465, a heat sink and a cooling fan are disposed below a light source unit.

SUMMARY

The present inventors examined cooling of a vehicle lamp and reached to recognize following problems. Since disposition of a cooling air blower is restricted by various conditions required on design, the air blower may not be disposed below the light source, but may be disposed other places in a lamp, for example, behind a heat dissipation portion. In addition, the heat generating source in the lamp is not limited to the light source. Recently, involved in the integration of control circuits installed in a lamp, heat generation from the control circuits tends to increase. In order to maintain an appropriate temperature environment in the lamp, it is desirable to consider the flow of air generated by the air blower.

The present disclosure has been made in consideration of the circumstances, and the present disclosure is to provide more efficient cooling of the vehicle lamp using an air circulation flow generated by the air blower.

In order to solve the above problems, a vehicle lamp according to an aspect of the present disclosure includes: a lamp body having a front opening; a front cover attached to the lamp body to cover the front opening, and configured to form a lamp chamber with the lamp body; a lamp unit including at least one light emitting element mounting portion having a heat dissipation portion, and disposed in the lamp chamber; an air blower configured to generate, in the lamp chamber, an air circulation flow including a cooling flow sent in a forward direction toward the heat dissipation portion and an intake flow returning to the rear, and an air blower support member configured to support the air blower so as to dispose the air blower behind the lamp unit in the lamp chamber, and to form an intake space through which the intake flow passes below the cooling flow.

According to the aspect, the air blower is disposed behind the lamp unit in the lamp chamber to intake air from the intake space below the cooling flow sent to the heat dissipation portion. As a result, the air blower may take in the relatively cool air collected in the lower portion in the lamp chamber to provide the cooling flow to the heat dissipation portion. In addition, it is possible to cool the lamp components disposed facing the intake space, by using the intake flow. In this way, it is possible to provide more efficient cooling of the vehicle lamp, by using the air circulation flow generated by the air blower.

The air blower support member may form a lower path that constitutes a portion of the intake space with the lamp body below the air blower, and an upper gap narrower than the lower path with the lamp body above the air blower.

The lamp body may include a body recess that constitutes a portion of the intake space. The body recess may be formed to receive the intake flow from the lower path, and to direct the intake flow to an intake port of the air blower.

The upper gap may be 5 mm or less.

The air blower support member may form a left side gap narrower than the lower path with the lamp body at the left side of the air blower, and form a right side gap narrower than the lower path with the lamp body at the right side of the air blower.

The vehicle lamp may further include an internal electronic device disposed within the lamp chamber. The internal electronic device may be disposed facing the intake space so as to be cooled by the intake flow.

The lamp unit may include a plurality of light emitting element mounting portions each having a heat dissipation portion. Heat dissipation portions of the respective light emitting element mounting portions are disposed in front of the air blower such that each of the heat dissipation portions receives the cooling flow from the air blower. The air blower support member may support the air blower obliquely with respect to the front side to reduce a difference in temperature rise of each of the heat dissipation portions.

Any combination of the above-described constituent elements, and those obtained by mutually substituting components or expressions of the present disclosure among methods, apparatuses, and systems are also effective as aspects of the present disclosure.

According to the present disclosure, it is possible to provide more efficient cooling of the vehicle lamp, by using the air circulation flow generated by the air blower.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, preferred exemplary embodiments of the present disclosure will be described based on the drawings. Further, the exemplary embodiments are not intended to limit the present disclosure thereto, but are merely illustrative. All features described in the exemplary embodiments or combinations thereof may not be essential for the present disclosure. Identical or corresponding components, members, and processes in each of the drawings will be denoted by the same symbols, and overlapping descriptions thereof will be appropriately omitted. In addition, a scale or a shape of each component illustrated in each of the drawings is conveniently set in order to facilitate descriptions thereof and should not be construed as being limited unless specified. In addition, for example, the terms "first" and "second" used herein or the claims are not intended to refer to any order or importance but are intended to discriminate a component from another component. In addition, a portion of members which are not important in describing the embodiment is omitted and displayed in each drawing.

Figure 1:
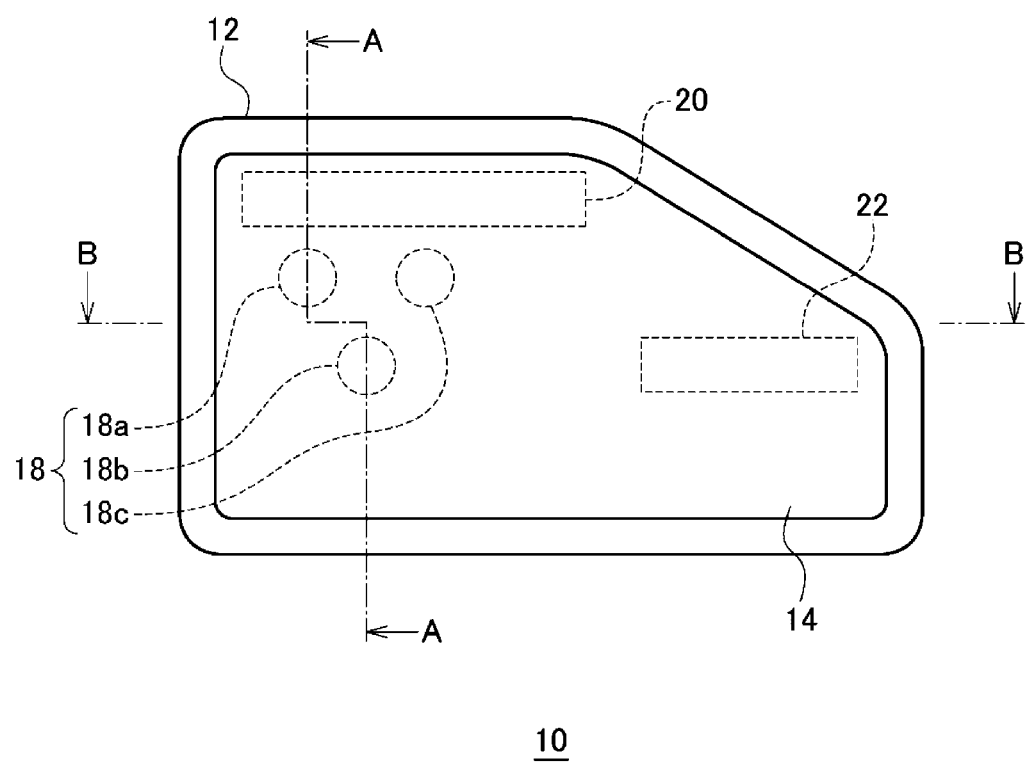
FIG. 1 is a schematic front view of a vehicle lamp according to an embodiment.
Figure 2:
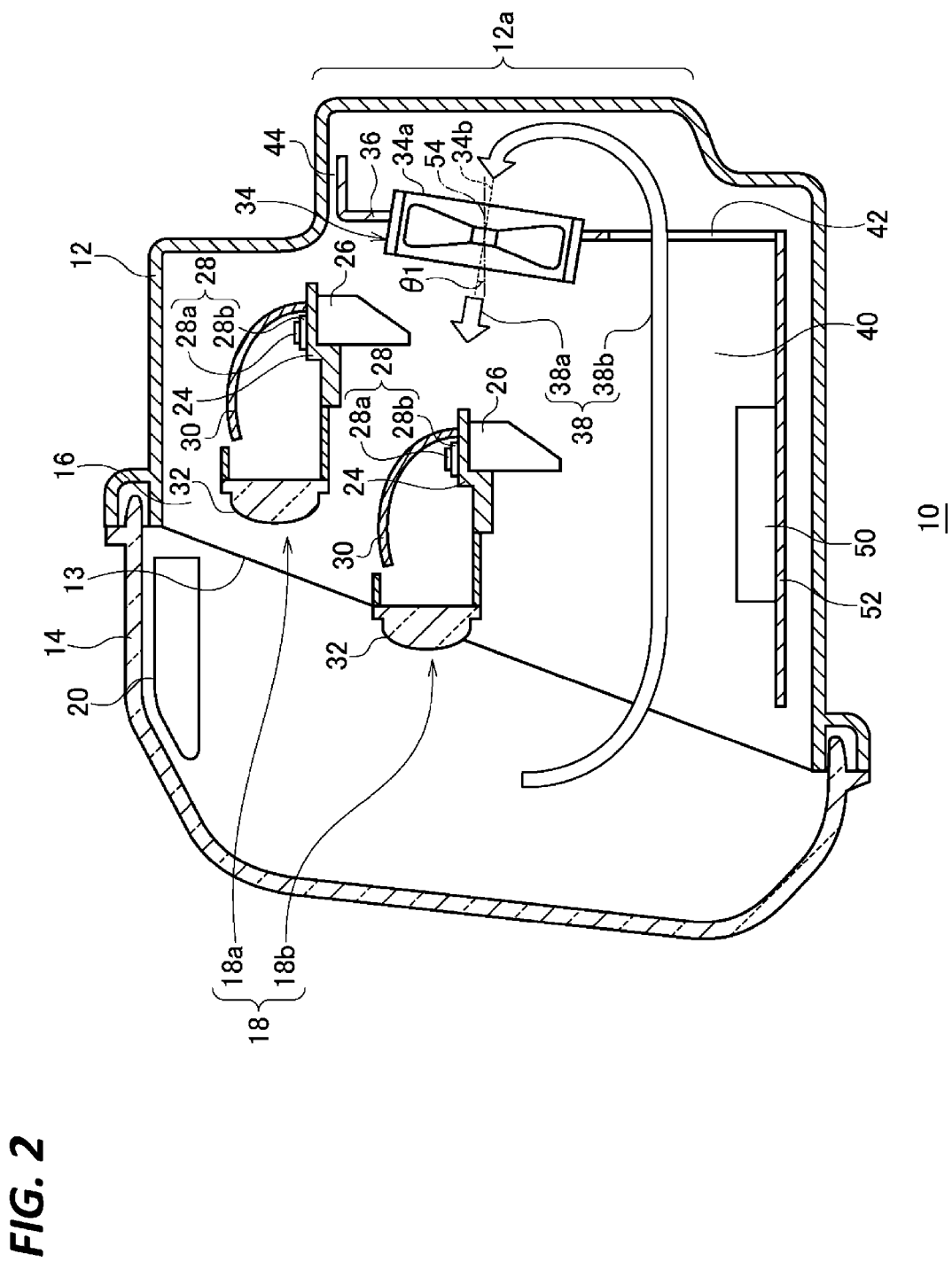
FIG. 2 is a schematic view illustrating a vertical cross-section taken along line A-A of the vehicle lamp illustrated in FIG. 1.
Figure 3:
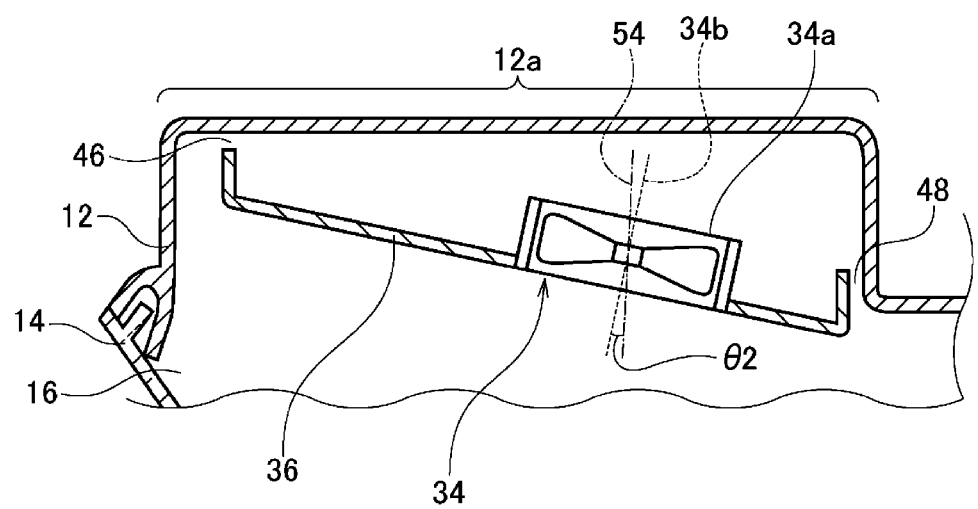
FIG. 3 is a schematic view illustrating a portion of a horizontal cross-section taken along line B-B of the vehicle lamp illustrated in FIG. 1.
Figure 4:
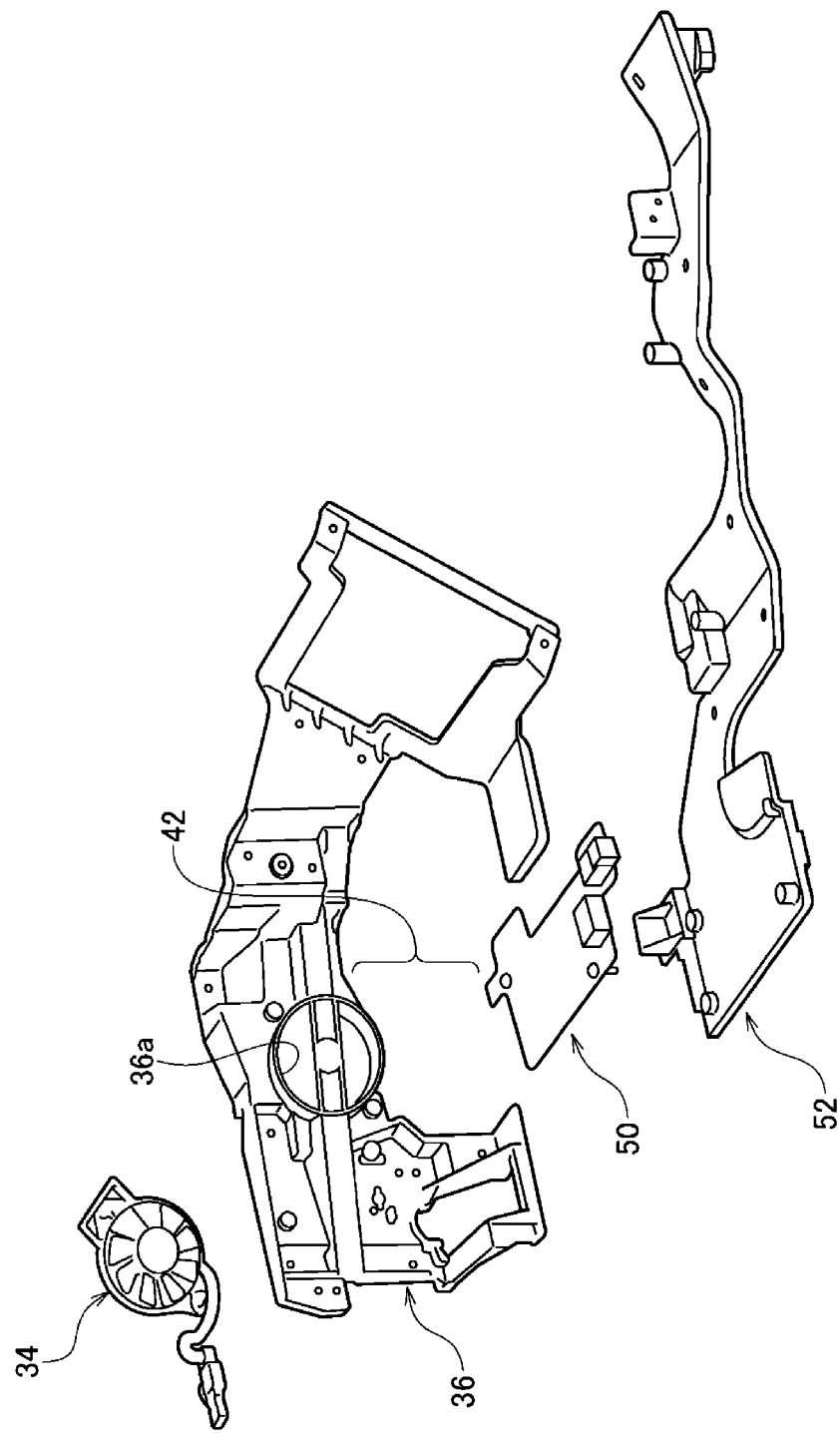
FIG. 4 is an exploded perspective view schematically illustrating an air blower and an air blower support member applicable to the vehicle lamp according to an embodiment.

FIG. 1 is a schematic front view of a vehicle lamp 10 according to an embodiment. FIG. 2 is a schematic view illustrating a vertical cross-section taken along line A-A of the vehicle lamp 10 illustrated in FIG. 1. FIG. 3 is a schematic view illustrating a portion of a horizontal cross-section taken along line B-B of the vehicle lamp 10 illustrated in FIG. 1. FIG. 4 is an exploded perspective view schematically illustrating an air blower 34 and an air blower support member 36 applicable to the vehicle lamp 10 according to an embodiment.

The vehicle lamp 10 is a vehicle headlamp device including a pair of headlamp units which are disposed at the front left and right sides of a vehicle, respectively. The pair of headlamp units has a substantially symmetrical structure, and has substantially the same configuration, and thus, FIG. 1 illustrates a vehicle lamp placed on the left side when viewed from the front of the vehicle body. Therefore, in FIGS. 1 and 3, the left side is the outer side in the vehicle width direction, and the right side is the inner side in the vehicle width direction.

The vehicle lamp 10 includes a lamp body 12 having a front opening 13, and a front cover 14 attached to the lamp body 12 so as to cover the front opening 13. The lamp body 12 is configured to be attachable to the vehicle body, and the front cover 14 is attached to the vehicle body via the lamp body 12. A lamp housing is constituted by the lamp body 12 and the front cover 14, and an internal space of the lamp housing is formed as a lamp chamber 16. The lamp body 12 is formed of, for example, a resin material. The front opening 13 is opened on the front side of the vehicle. The front cover 14 is formed of a translucent resin, glass, or the like.

The vehicle lamp 10 includes a lamp unit 18, a first marker lamp unit 20, and a second marker lamp unit 22, which are disposed in the lamp chamber 16. As an example, the lamp unit 18 functions as a headlamp, the first marker lamp unit 20 functions as a clearance lamp and/or a daylight running lamp, and the second marker lamp unit 22 functions as a front turn signal lamp. As a non-limiting example, the first marker lamp unit 20 is disposed above the lamp unit 18, and the second marker lamp unit 22 is disposed at inner side than the lamp unit 18.

The lamp unit 18 is supported by the lamp body 12 via a known rocking mechanism, and is configured to be able to adjust the direction of the optical axis that extends in the longitudinal direction of the vehicle in the vertical direction and/or the horizontal direction.

The lamp unit 18 includes a plurality of sub-assemblies 18a to 18c. The plurality of sub-assemblies are fixed relative to one another. The lamp unit 18 includes, for example, three sub-assemblies, and hereinafter, they may be referred to as a first sub-assembly 18a, a second sub-assembly 18b, and a third sub-assembly 18c. The first sub-assembly 18a, the second sub-assembly 18b, and the third sub-assembly 18c are arranged in this order from the outer side in the vehicle width direction. The second sub-assembly 18b is disposed below the first sub-assembly 18a, and the third sub-assembly 18c is disposed at the same height as the first sub-assembly 18a. The second sub-assembly 18b is disposed forward of the first sub-assembly 18a and the third sub-assembly 18c.

As illustrated in FIG. 2, the respective sub-assemblies include a light emitting element mounting portion 24 having a heat dissipation portion 26. In addition, the respective sub-assemblies include a light source 28 and at least one optical member (e.g., a reflector 30 and a projection lens 32). For the sake of understanding, in FIG. 2, not only the second sub-assembly 18b, but also the first sub-assembly 18a is schematically illustrated in the vertical cross-section.

The light emitting element mounting portion 24 provides a support surface that supports the light source 28, and is integrally formed with the heat dissipation portion 26. The heat dissipation portion 26 includes a plurality of heat dissipating fins that extend rearward from the light emitting element mounting portion 24. The respective heat dissipating fins may be parallel to the vertical surface. The light emitting element mounting portion 24 and the heat dissipation portion 26 also function as a heat dissipating member that dissipates heat generated by the light source 28, and are also referred to as a "heat sink." The light emitting element mounting portion 24 and the heat dissipation portion 26 are made of, for example, a metal material having high thermal conductivity such as aluminum or an aluminum alloy, and are manufactured by, for example, a die casting method. In addition, the light emitting element mounting portion 24 is configured to support the reflector 30 and the projection lens 32.

The light source 28 includes, for example, a semiconductor light emitting element 28a such as a light emitting diode (LED), and a substrate 28b that supports the semiconductor light emitting element 28a. The substrate 28b is a thermal conductive insulating substrate formed of ceramic or the like. An electrode (not illustrated) that transfers power to the semiconductor light emitting device 28a is formed on the substrate 28b. The light source 28 is mounted on the light emitting element mounting portion 24 in a state where a light outputting surface of the semiconductor light emitting element 28a is directed upper side of the vehicle, and an irradiation axis of the semiconductor light emitting element 28a extends substantially in the vertical direction of the vehicle.

The reflector 30 is disposed above the light source 28 so as to reflect the light output from the light source 28 to the projection lens 32. The reflector 30 is a reflecting member in which a reflecting surface is formed on the inner surface facing the light source 28, and the reflecting surface is formed of, for example, a portion of a spheroid. In addition, the projection lens 32 is disposed in front of the light source 28 so as to project the light reflected from the reflector to the front of the lamp. The projection lens 32 is, as an example, a plano-convex aspheric lens having a convex front surface and a flat rear surface, and is formed of a transparent resin material.

In addition, the vehicle lamp 10 includes the air blower 34 and the air blower support member 36. The air blower 34 and the air blower support member 36 are disposed in the lamp chamber 16. The air blower 34 includes an intake port 34a on the rear side, and sends the air sucked from the intake port 34a to the front. The air blower 34 is, for example, an axial fan. The air blower support member 36 is, for example, a bracket formed of a resin material, and is attached to the lamp body 12. As illustrated in FIG. 4, the air blower support member 36 may be, for example, a plate-shaped member having a circular air blower attaching hole 36a, and the air blower 34 may be a thin fan attached to the air blower attaching hole 36a.

As illustrated in FIG. 2, the air blower 34 is configured to generate an air circulation flow 38 in the lamp chamber 16. The air circulation flow 38 includes a cooling flow 38a sent forward toward the heat dissipation portion 26, and an intake flow 38b returning to the rear. The air blower 34 sucks the intake flow 38b from the intake port 34a, and sends air to the front as the cooling flow 38a.

The air blower support member 36 dispose the air blower 34 behind the lamp unit 18 in the lamp chamber 16. The air blower support member 36 is formed as a separate part from the lamp body 12, and is disposed in front of the lamp body 12 and behind the lamp unit 18. The air blower support member 36 forms, so-called a duct between the air blower support member 36 and the lamp body 12 to guide the intake flow 38b to the intake port 34a of the air blower 34.

The air blower support member 36 supports the air blower 34 so as to form an intake space 40 through which the intake flow 38b passes below the cooling flow 38a. The air blower support member 36 determines the height position of the air blower 34 such that the intake flow 38b passes through below the cooling flow 38a.

The air blower support member 36 forms a lower path 42 that constitutes a portion of the intake space 40 with the lamp body 12 below the air blower 34. The lower path 42 is an opening formed on the lower side of the air blower support member 36. For example, the lower path 42 may be an opening formed at the air blower support member 36 so as to be adjacent to the lower side of the air blower 34. The opening that forms the lower path 42 may be, for example, a relatively large opening that occupies at least ¼, or at least ⅓, or at least ½ of the height (dimension in the vertical direction) of the air blower support member 36.

The air blower support member 36 forms an upper gap 44 narrower than the lower path 42 with the lamp body 12 above the air blower 34. The upper gap 44 is, for example, 5 mm or less. The upper gap 44 may be, for example, larger than 0.1 mm, or larger than 1 mm. Alternately, at least a portion of the upper end of the air blower support member 36 may be in contact with the lamp body 12, whereby at least a portion of the upper gap 44 may be blocked.

In addition, as illustrated in FIG. 3, the air blower support member 36 forms a left side gap 46 with the lamp body 12 at the left side of the air blower 34, and a right side gap 48 with the lamp body 12 at the right side of the air blower 34.

Similar to the upper gap 44, the left side gap 46 and the right side gap 48 are narrower than the lower path 42. The left side gap 46 and the right side gap 48 are, for example, 5 mm or less, respectively. The left side gap 46 and the right side gap 48 may be, for example, larger than 0.1 mm, or larger than 1 mm. At least a portion of the left side gap 46 and the right side gap 48 may be blocked by the contact between the air blower support member 36 and the lamp body 12.

The lamp body 12 includes a body recess 12a that constitutes a portion of the intake space 40. The body recess 12a is formed so as to receive the intake flow 38b from the lower path 42, and to direct the intake flow 38b to the intake port 34a of the air blower 34. The body recess 12a is formed such that the rear surface of the lamp body partially bulges from the inside to the outside at the rear of the air blower support member 36.

In addition, as illustrated in FIG. 2, the vehicle lamp 10 includes an internal electronic device 50 disposed in the lamp chamber 16. The internal electronic device 50 is disposed facing the intake space 40 so as to be cooled by the intake flow 38b. The internal electronic device 50 is, for example, a control circuit substrate that controls the first marker lamp unit 20 and the second marker lamp unit 22. The internal electronic device 50 may be a controller that controls the lamp unit 18. Alternately, the internal electronic device 50 may be a sensor, a camera, or other electronic devices disposed in the lamp chamber 16.

The internal electronic device 50 is attached to a bracket 52. The bracket 52 is disposed in the lower portion of the lamp chamber 16 along the lower surface of the lamp body 12. The rear end of the bracket 52 is connected to the lower end of the air blower support member 36. The bracket 52 is a separate part from the air blower support member 36, and is formed of, for example, a resin material. The bracket 52 may be a wiring support bracket to which a wire harness connected to the lamp unit 18 is fixed.

The bracket 52 may be integrally formed with the air blower support member 36. Alternately, the bracket 52 may not be provided, and the internal electronic device 50 may be directly attached to the lamp body 12 without the bracket 52.

The heat dissipation portion 26 of the respective light emitting elements 24 of the lamp unit 18 is disposed in front of the air blower 34 such that each heat dissipation portion 26 receives the cooling flow 38a from the air blower 34. The air blower support member 36 supports the air blower 34 obliquely with respect to the front so as to reduce the difference in temperature rise of each heat dissipation portion 26.

The center axis (e.g., the rotational axis of the fan) 34b of the air blower 34 is inclined at an inclination angle $\theta 1$ with respect to the reference axis 54 parallel to the optical axis of the lamp unit 18. The center axis 34b of the air blower 34 is inclined, for example, upward with respect to the reference axis 54. In addition, the center axis 34b of the air blower 34 is inclined at an inclination angle $\theta 2$ with respect to the reference axis 54 (see FIG. 3). The center axis 34b of the air blower 34 is inclined, for example, to the outer side in the vehicle width direction with respect to the reference axis 54.

The inclination angles $\theta 1$ and $\theta 2$ of the air blower 34 are selected to reduce the difference in the temperature rise of each heat dissipation portion 26, as compared to a case where the center axis 34b of the air blower 34 coincides with the reference axis 54 (that is, the air blower support member 36 supports the air blower 34 to face the front). Such inclination angles $\theta 1$ and $\theta 2$ are selected by, for example, performing numerical simulation on flow velocity distribution of the air in the lamp chamber 16 generated by the air circulation flow 38, and temperature distribution in the lamp chamber 16 as a result thereof.

By the above configuration, while the vehicle lamp 10 is turned ON, light emitted from the light source 28 is reflected by the reflector 30, and is projected in front of the lamp through the projection lens 32. The light source 28 may generate heat during turning ON. The heat is transferred from the light source 28 through the light emitting element mounting portion 24 to the heat dissipation portion 26 to be dissipated.

In order to facilitate the heat dissipation from the heat dissipation portion 26, the air blower 34 generates the air circulation flow 38 including the cooling flow 38a and the intake flow 38b. The cooling flow 38a is sent toward from the air blower 34, and emitted to the heat dissipation portion 26 of the respective sub-assemblies 18a to 18c. The cooling flow 38a passes through the vicinity of the heat dissipation portion 26 while exchanging heat with the heat dissipation portion 26, and transmits the heat from the heat dissipation portion 26. That is, the cooling flow 38a cools the heat dissipation portion 26 via the heat dissipation portion 26.

The air flow that cools the heat dissipation portion 26 returns to the rear as the intake flow 38b. The intake flow 38b is guided into the intake space 40 and passes through below the cooling flow 38a by the air circulation action by the air blower 34. The intake flow 38b is directed from the intake space 40 through the lower path 42 to the body recess 12a. The direction of the intake flow 38b is changed upward by the body recess 12a, and is sucked into the air blower 34 from the intake port 34a of the air blower 34. The cooling flow 38a is repeatedly sent forward from the air blower 34.

Since the upper gap 44, the left side gap 46, and the right side gap 48 are narrower than the lower path 42, the body recess 12a is configured as, so-called a semi-closed section in which the upper portion, the left side portion, and the right side portion are narrowed. For the intake flow 38b, the lower path 42 is substantially the only inlet to the semi-closed section, and the intake port 34a of the air blower 34 is substantially the only outlet.

As described above, according to the vehicle lamp 10 according to the embodiment, the air blower 34 generates the air circulation flow 38 in the lamp chamber 16 including the cooling flow 38a that is sent forward toward the heat dissipation portion 26, and the intake flow 38b that returns to the rear. The air blower support member 36 supports the air blower 34 so as to dispose the air blower 34 behind the lamp unit 18 in the lamp chamber 16, and form the intake space 40 through which the intake flow 38b passes below the cooling flow 38a.

In this way, the air blower 34 is disposed behind the lamp unit 18 in the lamp chamber 16, and intakes air from the intake space 40 below the cooling flow 38a sent to the heat dissipation portion 26. Relatively cool air may be gathered in the lower portion of the lamp chamber 16 by the action of gravity. The air blower 34 may provide the cooling flow 38a to the heat dissipation portion 26 by taking in such air. It is possible to provide the more efficient cooling of the vehicle lamp 10, by using the air circulation flow 38 generated by the air blower 34.

In addition, the air blower support member 36 forms the lower path 42 with the lamp body 12 below the air blower 34, and the upper gap 44 narrower than the lower path 42 with the lamp body 12 above the air blower 34. In this way, the inflow of air from the lower path 42 to the air blower 34 is promoted compared to the inflow of air from the upper gap 44 to the air blower 34. In the same way, the inflow of air from the lower path 42 to the air blower 34 is promoted compared to the inflow of air from the right side gap 48 to the air blower 34. Therefore, making the upper gap 44 narrower than the lower path 42 helps to generate the air circulation flow 38 such that the intake flow 38b passes through below the cooling flow 38a.

The air blower support member 36 forms the left side gap 46 narrower than the lower path 42 with the lamp body 12 at the left side of the air blower 34, and the right side gap 48 narrower than the lower path 42 with the lamp body 12 at the right side of the air blower 34. In this way, the inflow of air from the lower path 42 to the air blower 34 is promoted compared to the inflow of air from the left side gap 46 to the air blower 34. In the same way, the inflow of air from the lower path 42 to the air blower 34 is promoted compared to the inflow of air from the right side gap 48 to the air blower 34. Therefore, this configuration helps to generate the air circulation flow 38 such that the intake flow 38b passes through below the cooling flow 38a.

The upper gap 44 is 5 mm or less. In this way, since the upper gap 44 is sufficiently narrow, it is possible to significantly suppress the inflow of air from the upper gap 44 to the air blower 34. Since the left side gap 46 and the right side gap 48 are also 5 mm or less, it is possible to significantly suppress the inflow of air from the left side gap 46 and the right side gap 48 to the air blower 34.

The body recess 12a is formed so as to receive the intake flow 38b from the lower path 42, and to direct the intake flow 38b to the intake port 34a of the air blower 34. In this way, a duct-like region is formed between the air blower support member 36 and the lamp body 12 to guide the intake flow 38b to the intake port 34a of the air blower 34.

The internal electronic device 50 is disposed facing the intake space 40 so as to be cooled by the intake flow 38b. In this way, the internal electronic device 50 may be cooled by using the cooling flow 38b. In addition, the cooling flow 38b may cool other lamp components disposed facing the intake space 40.

The heat dissipation portion 26 of the respective light emitting elements 24 of the lamp unit 18 is disposed in front of the air blower 34 such that each heat dissipation portion 26 receives the cooling flow 38a from the air blower 34. The air blower support member 36 supports the air blower 34 obliquely with respect to the front so as to reduce the difference in temperature rise of each heat dissipation portion 26. In this way, each heat dissipation portion 26 may be cooled more evenly.

In the above-described embodiment, although the lamp unit 18 includes the plurality of light emitting element mounting portions 24, the present disclosure is not limited thereto. The lamp unit 18 may include one light emitting element mounting portion 24. Therefore, the lamp unit 18 may include at least one light emitting element mounting portion 24 having the heat dissipation portion 26.

Although the vehicle lamp 10 serving as the vehicle headlamp device has been described in the above-described embodiment, the present disclosure is not limited thereto. The air bower and the support structure thereof according to the embodiment may be applied to any other vehicle lamp in which it is desired to cool the lamp component by using an air circulation flow generated by the air blower.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lamp comprising:
a lamp body having a front opening;
a front cover attached to the lamp body to cover the front opening and configured to form a lamp chamber with the lamp body;
a lamp including at least one light emitting source mounting portion having a heat dissipation portion, and disposed in the lamp chamber;
an air blower facing a front side of the lamp body configured to generate, in the lamp chamber, an air circulation flow including a cooling flow directly sent in a forward direction toward the front side of the lamp body past a rear end of the lamp and the heat dissipation portion, and an intake flow returning to a rear side of the lamp body; and
an air blower support including a first opening configured to support the air blower so as to dispose the air blower behind the lamp in the lamp chamber, and a second opening to form an intake space through which the intake flow passes below the cooling flow,
wherein the heat dissipation portion is positioned outside the air blower support,
the air blower support forms a lower path that constitutes a portion of the intake space with the lamp body below the air blower, and an upper gap narrower than the lower path with the lamp body above the air blower, and
the air blower support forms a left side gap narrower than the lower path with the lamp body at the left side of the air blower, and forms a right side gap narrower than the lower path with the lamp body at the right side of the air blower.

2. The vehicle lamp according to claim 1, wherein the lamp body includes a body recess that constitutes a portion of the intake space, and the body recess is formed to receive the intake flow from the lower path, and to direct the intake flow to an intake port of the air blower.

3. The vehicle lamp according to claim 2, the upper gap is 5 mm or less.

4. The vehicle lamp according to claim 1, the upper gap is 5 mm or less.

5. The vehicle lamp according to claim 1, further comprising:
an internal electronic device disposed within the lamp chamber,
wherein the internal electronic device is disposed facing the intake space so as to be cooled by the intake flow.

6. The vehicle lamp according to claim 1, wherein the lamp includes a plurality of light emitting source mounting portions each having a heat dissipation portion,
heat dissipation portions of the respective light emitting source mounting portions are disposed in front of the air blower such that each of the heat dissipation portions receives the cooling flow from the air blower, and
the air blower support supports the air blower obliquely with respect to a front side of the air blower support to reduce a difference in temperature rise of each of the heat dissipation portions.

* * * * *